(12) United States Patent
Knapp

(10) Patent No.: US 6,367,504 B1
(45) Date of Patent: Apr. 9, 2002

(54) MULTI-WAY STOP OR DIVERTER VALVE

(75) Inventor: Francesco Knapp, Cava Manara (IT)

(73) Assignee: Masco Corporation of Indiana, Taylor, IN (US)

( * ) Notice: Subject to any disclaimer, the term of this patent is extended or adjusted under 35 U.S.C. 154(b) by 0 days.

(21) Appl. No.: 09/529,253

(22) PCT Filed: Oct. 6, 1998

(86) PCT No.: PCT/US98/20974

§ 371 Date: Apr. 6, 2000

§ 102(e) Date: Apr. 6, 2000

(87) PCT Pub. No.: WO99/18378

PCT Pub. Date: Apr. 15, 1999

(30) Foreign Application Priority Data

Oct. 6, 1997 (IT) ............................................ T097A0885

(51) Int. Cl.[7] .............................................. F16K 11/074
(52) U.S. Cl. .................................. 137/625.11; 251/185
(58) Field of Search ..................... 137/625.11; 251/175, 251/185

(56) References Cited

U.S. PATENT DOCUMENTS

| | | |
|---|---|---|
| 2,377,473 A | 6/1945 | Wolcott |
| 2,578,160 A | 12/1951 | Van Der Werff |
| 2,593,733 A * | 4/1952 | Davies ................... 137/625.11 |
| 2,840,109 A | 6/1958 | Wadleigh |
| 2,888,098 A | 5/1959 | Florence |
| 2,911,009 A | 11/1959 | Parker |
| 2,924,207 A | 2/1960 | Hottenroth |
| 2,979,963 A | 4/1961 | Snoy |
| 3,633,621 A * | 1/1972 | Myers .................... 137/625.11 |
| 3,837,360 A | 9/1974 | Bubula |
| 3,987,819 A | 10/1976 | Scheuermann |
| 4,294,285 A | 10/1981 | Joslyn |
| 4,410,001 A * | 10/1983 | Goguen ............. 137/625.11 X |
| 4,981,156 A | 1/1991 | Nicklas et al. |
| 5,018,553 A | 5/1991 | Grassberger et al. |
| 5,195,555 A | 3/1993 | Knapp |
| 5,505,225 A | 4/1996 | Niakan |

FOREIGN PATENT DOCUMENTS

DE 2246763 3/1974

* cited by examiner

Primary Examiner—John Rivell
(74) Attorney, Agent, or Firm—Reising, Ethington, Barnes, Kisselle, Learman & McCulloch, PC

(57) ABSTRACT

A diverter valve includes a fixed body (11) with a central inlet connection (12) and several outlet ducts (17) circumferentially spaced about the inlet connection. A rotatable valve member (21) has a center inlet duct (25) in fluid connection with a radially spaced outlet (27) that can be rotatably moved to be aligned with a selected outlet ducts (17) or misaligned to be in a shut off position. The inlet connection (12) and outlet (27) house sealing elements that provide sealing against leakage for the respective ducts.

7 Claims, 3 Drawing Sheets

MULTI-WAY STOP OR DIVERTER VALVE

TECHNICAL FIELD

This invention relates to a multi-way shut-off or diverter valve, comprising a fixed body that has an inlet connection and at least one outlet connection one or the other of which is connected to the inlet connection.

BACKGROUND OF THE INVENTION

Shut-off and diverter valves are commonly inserted between a flow control device, for example, a mixing faucet or a thermostatic valve, and two or more units that can be supplied under the control of the device. For example, a device of this kind can make it possible to supply, as desired, the tap of a bathtub, a handheld shower head, a shower with a fixed head, and possibly some other hydraulic delivery unit. Often these types of valves have a driven mobile valve element rotatable about an axis to bring about the desired fluid connection between the inlet connection and a selected one of the outlet connections.

A diverter valve of this kind can easily be made by using small plates made from hard material, such as ceramics or structural plastics. However, many common designs demand that these thin plates assume a relatively considerable diameter. The enlarged diameter of the valve in addition to being expensive contribute give rise to excessive wear and tear that often interferes with the operation of the valve.

What is needed is a valve of the type indicated which will not have any great degree of wear or tear and which will therefore be easily operated. What is also needed is to have a diverter valve that can be easily manufactured on an industrial scale and be relatively economical.

SUMMARY OF THE INVENTION

In accordance with one aspect of the invention, a valve device is operably interposable between a flow control device and at least one fluid delivery unit that can be supplied under the control of the valve device. The valve device includes a fixed body with an inner facing surface and a rotatable valve member. The fixed body has a respective facing surface that has an inlet connection and at least one outlet connection radially spaced from said inlet connection. Preferably, the fixed body has at least two outlets at its inner facing surface both being equally spaced from the inlet in the fixed body.

The rotatable valve member has a respective facing surface that is rotatable about a common axis with the inlet connection. The rotatable valve member is movable to selectively open and close fluid connection between the inlet connection of the fixed body and one of the outlet connections of said fixed body member.

Either the fixed body or rotatable valve member houses a first sealing member sealingly biased against the facing surface of the other of the fixed body or rotatable valve member. Preferably, the first sealing member is seated in the fixed body and sealingly biased against the facing surface of the rotatable member about the inlet opening. Alternatively, the first sealing member is seated in the fixed body and sealingly biased against the surface of the rotatable member about the inlet opening.

The rotatable member has an internal conveyance duct that has an inlet opening on its surface co-aligned with the inlet connection in the fixed body and the axis of rotation. The internal conveyance duct has an outlet radially spaced the same distance from the inlet of the rotatable member as the at least one outlet in the fixed member is spaced from its respective inlet connection.

A respective second sealing member is seated either in one of the outlets in said fixed body or the outlet in the rotatable member and is biased against a surface of the other of said rotatable member and fixed body. Preferably the respective sealing member is positioned at the outlet end of the conveyance duct and biased to abut the inner facing surface of the fixed body. The sealing members are preferably made from elastomeric material and are biased by a respective spring. In an alternate embodiment, the members are made from elastomeric material that are biased by their own resilient elasticity. In another embodiment, the respective sealing members are collars made from rigid material pushed by springs and provided with a retaining packing.

Preferably, the respective second sealing member in either the rotatable valve member or fixed body can be completely misaligned from any of the outlets in the other of the rotatable members or fixed body and sealingly closes the duct from the outlet in said fixed body to form a stop valve.

In one embodiment, the rotatable valve member is assembled to a second rotatable member. The conveyance duct is determined by the configuration in the nature of a cavity presented by the respective facing surfaces of the juxtaposed rotatable valve member and second rotatable member. Preferably, either the rotatable valve member or second rotatable member is linked to a driving device and a torque transmitter is provided between the second rotatable member and rotatable valve member.

It maybe desirable to include a resiliently biased detent release member to be positioned between the fixed body and the rotatable valve member and engaging a notch or debossment to provide an indication of the correct operating position of the valve where one respective sealing member is exactly aligned about the other of the outlets in the rotatable member and one outlet in the fixed body.

It is also desirable to include a stop limiter interconnected between the fixed body and rotatable valve member for limiting the rotational movement that the rotatable member may have with respect to the fixed body.

BRIEF DESCRIPTION OF THE DRAWING

Reference now is make to the accompanying drawings in which.

DETAILED DESCRIPTION OF THE PREFERRED EMBODIMENT

Figure 1:
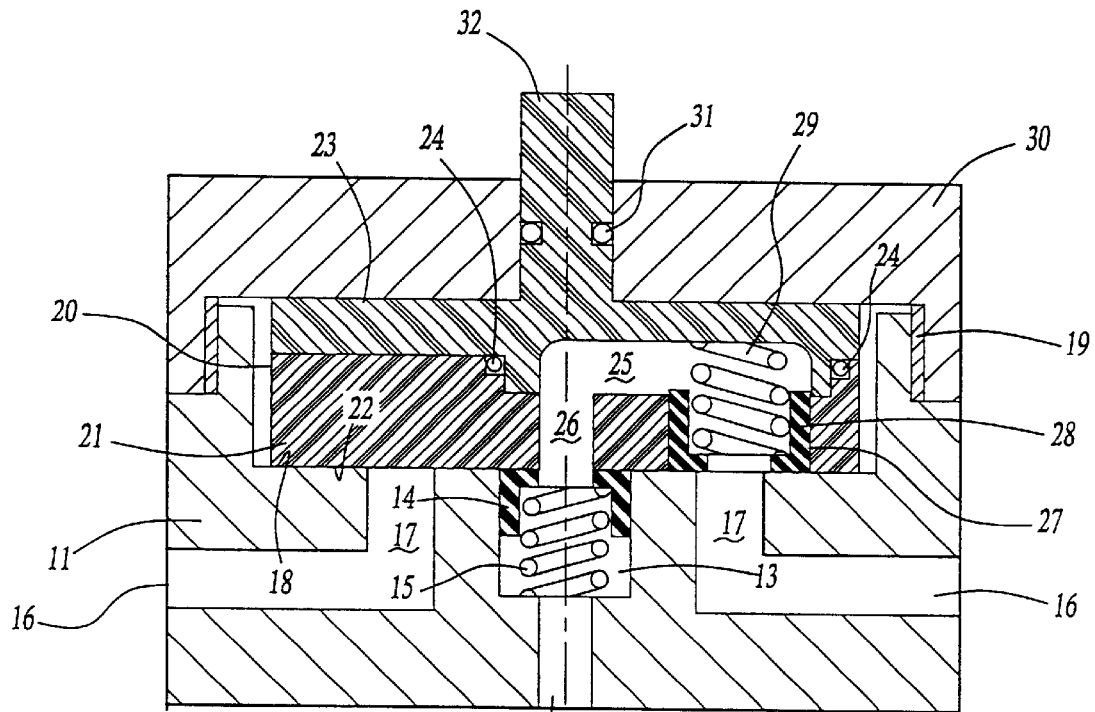
FIG. 1 is a schematic segmented view that illustrates the essential parts of a valve according to the invention.
Figure 2:
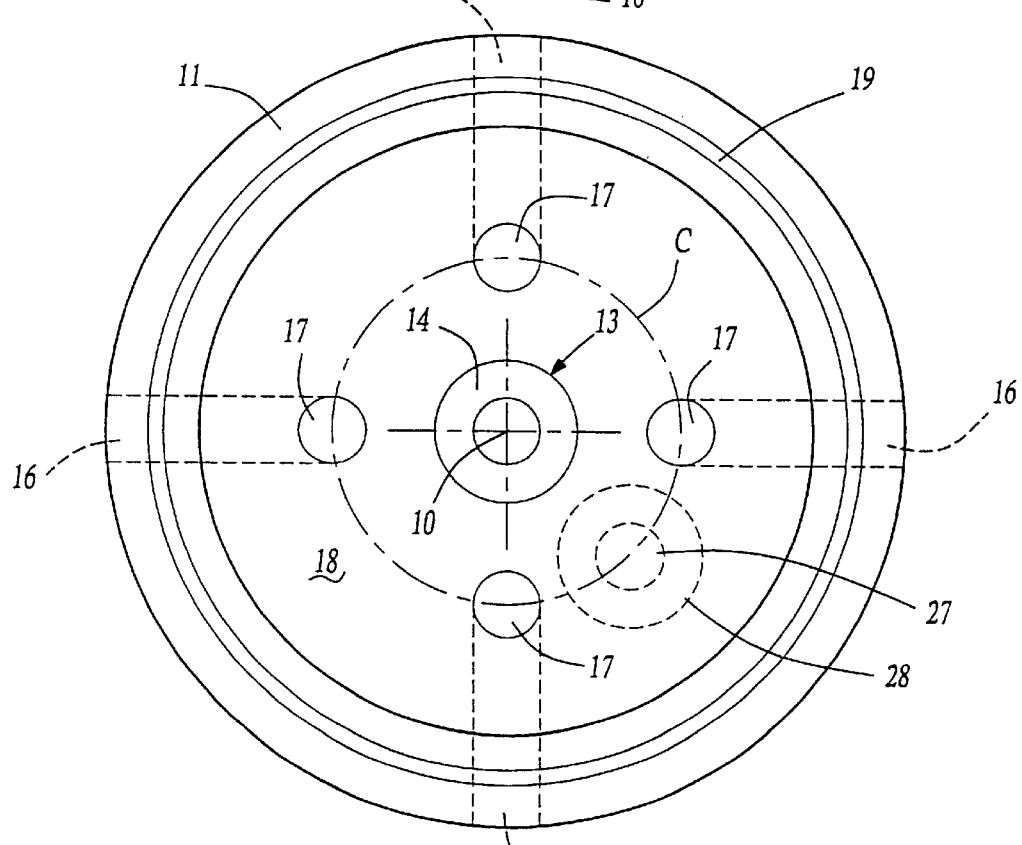
FIG. 2 is a plan view looking down on the fixed body of the valve.
Figure 3:
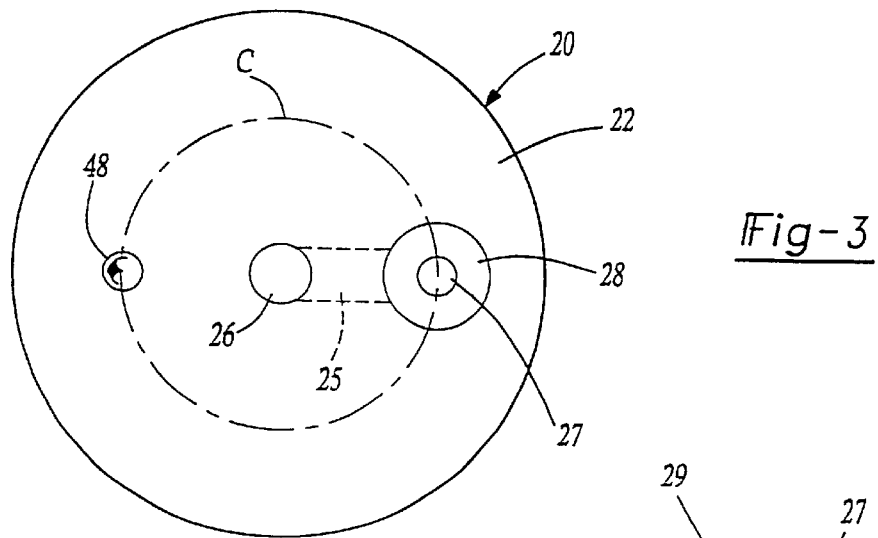
FIG. 3 is a plan view of the rotatable assembly at surface 22.

The basic principle behind the invention will be described with reference to FIGS. 1–3, which schematically illustrate only the essential parts of the valve.

The valve comprises a fixed body 10 which, under operating conditions, is sealing enclosed by a cap 30. The fixed body 10 has an inlet connection 12 to which is linked an inlet duct 13 that extends along an axis 10. In inlet duct 13, there is housed a first sealing element which, in the form shown, is commercially available by annular elastomeric ring 14 seated above and biased by a coil spring 15. Furthermore, fixed body 11 has a plurality of outlet connections 16, each of which is linked to an outlet duct 17.

Inlet connection 12 is intended to be connected to the outlet of a flow control device (not shown) which, for example, can be a mixing faucet or a thermostatic valve, and each of the outlet connections 16 is intended to be connected to a hydraulic unit (not shown), which one wishes to be able to supply through the above-mentioned flow control device. These hydraulic units, for example, can be the tap spouts, showerheads, hand held showers or the like.

Inlet duct 13 and outlet duct 17 empty upon an internal surface 18 of fixed body 11 which, in this example, is planar in shape but which can have a different contour. Any selected contour must display circular symmetry with respect to axis 10. All outlet ducts 7 empty upon internal surface 18 at a distance or a circumference C having its center on axis 10, as clearly illustrated in FIG. 2. Fixed body 11 also has a fastening device such as thread 19 for engaging cap 30.

A rotatable assembly 20 has a first part that includes a disc 21 with a surface 22 that faces internal surface 18 of fixed body 11. The surfaces 18 and 22 are arranged in loose sliding contact with each other or in close spaced proximity to each other. The rotatable assembly 20 is completed by a second part 23 mounted to the rotatable disc 21 and retained by a packing 24. The two parts 21 and 23 of the rotatable assembly 20 are constructed and shaped such that when assembled together, a conveyance duct 25, is defined inside the assembly 20. The duct 25 has a first inlet 26 that empties upon surface 22 along axis 10 and, therefore, aligns with the inlet duct 13 of fixed body 11 and an outlet 27 which is positioned a distance that corresponds to the circumference C as shown in FIG. 3 and thus selectively alignable with outlet duct 17. In this outlet part 27, there is housed a second annular elastomeric sealing element 28 that is also resiliently biased against surface 18 of fixed body 11 by a spring 29. Similarly the sealing element collar 14 is biased and retained against surface 22 of the rotatable member 21 about inlet 26 by spring 15.

Rotatable member 20 is mounted rotatably in fixed body 11 so as to be able to rotate around axis 10. It is integrally formed with a control stem 32 that extends out of cap 30 and aligned with axis 10. A packing 31 prevents leakage. Control stem 32 can be attached to a knob, lever or other handle (not shown).

The described valve works in the following manner. Rotatable member 20 is pivoted from any torque forces transferred from control stem 32 so that outlet 27 of conveyance duct 25 becomes aligned with one of the pre-selected ducts 17 of fixed body 11. The following open hydraulic circuit is established between connection 12, inlet duct 13, inlet part 26, conveyance duct 25, outlet part 26, outlet duct 17, and outlet connection 16. Therefore, an outlet of a flow control device that is connected an inlet connection 12 is enabled to supply a hydraulic unit connected to the pre-selected outlet duct 16, while all the other hydraulic units connected to the other outlet connections 16 are not supplied and sealed from any water leakage. The valve thus makes it possible to direct the water supply coming from a flow control device to a selected hydraulic unit of an assembly, dependent on the rotated position of rotatable member 20.

Furthermore, the rotatable member can possibly also be pivoted into a shut-off or closed position in which outlet 27 of the conveyance duct corresponds to a point on surface 18 of fixed body 11 where no outlet duct 17 is present and thus sealing outlet 27 via sealing element 28 against surface 18. In this case, the valve intercepts the supply of water. One shut-off position of outlet 27 and sealing element 28 is shown in phantom in FIG. 2.

Figure 4:
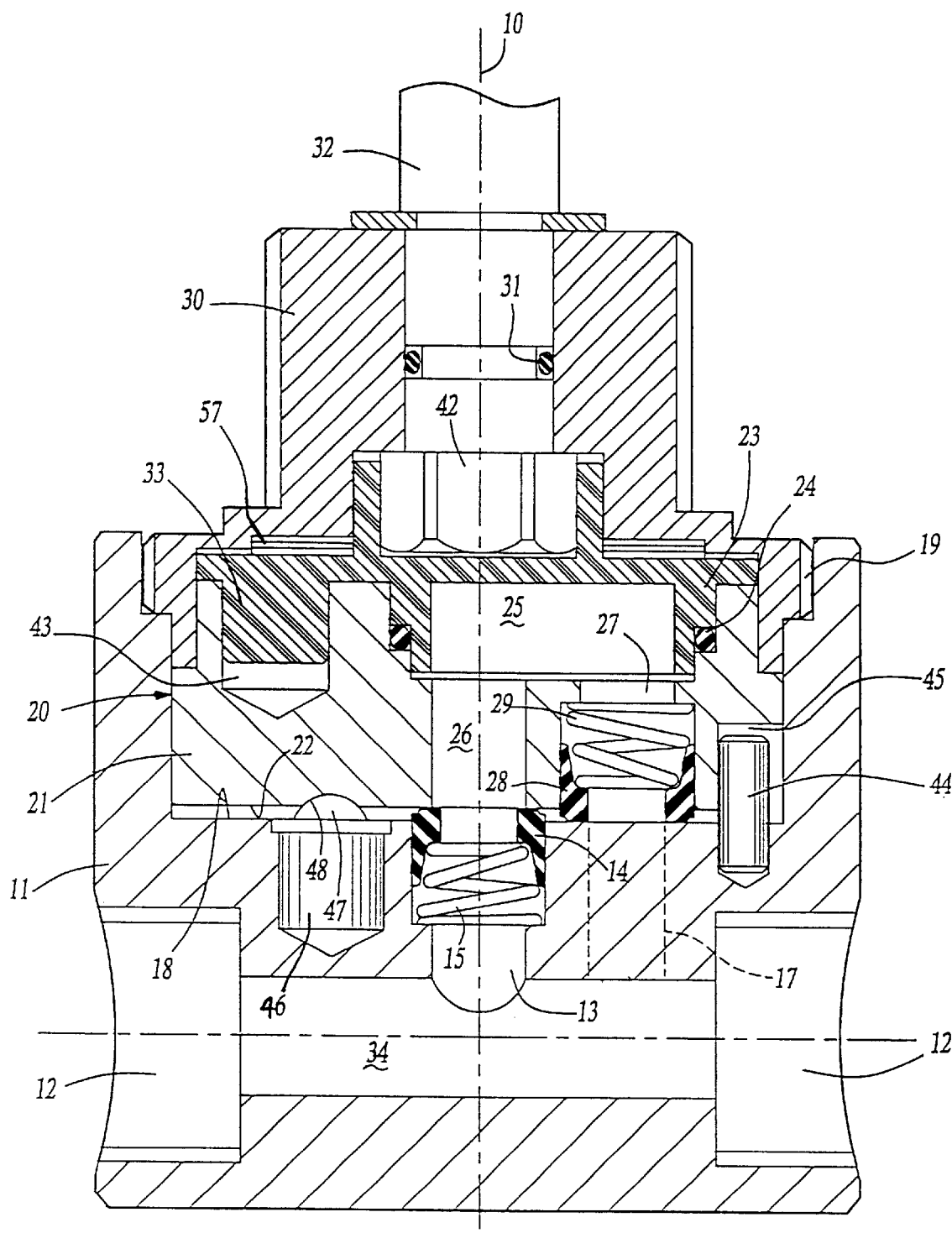
FIG. 4 is a diametrical profile illustrating an embodiment of the valve according to the invention.

A possible practical embodiment of the valve is shown in a cross-sectional segmented view in FIG. 4. The parts that correspond to those in FIGS. 1–3 have the same reference numbers and will not be further described. In this case, body 11 has two inlet connections 12 which are connected to each other by a passage 34 and are connected to inlet duct 13 in which is located a sealing element 14 and spring 15. This arrangement makes it possible to use one or the other of connections 12 which is in the most favorable position for installation, while closing off the opposite. Alternatively, the opposite inlet 12 can connect to a pipeline intended to be supplied independently of the position of the diverter valve. Furthermore, fixed body 11 has a plurality of outlet connections 16, which are not visible, because they are not in the profile plane, and a plurality of corresponding outlet ducts 17, which are likewise not visible but shown in phantom as if it is to be shown on the profile plane. In this FIG. 4, the valve is shown in the shut-off position.

The second part 23 of the rotatable assembly 20 is not made in one piece with the control stem 32 but is coupled to the control stem by means of a prismatic coupling 42. Furthermore, to transmit in the best possible fashion to the first part 21 the rotating movements received from control stem 32, part 13 has a projection 33 that engages a correspondingshaped cavity 43 in part 21.

In many cases it is not suitable for the rotatable member 20 to perform an unlimited rotation, so stop limits are built into the valve device. A peg 44 is inserted in fixed body 11. The peg 44 engages a notch 45 that extends along the periphery of member 21 and whose extension determines the range of rotation of rotatable assembly 20.

Also provided is a detent device 46 (illustrated by way of an external view), comprising on the inside, for example, a sphere 47 that is biased upward by a spring (not shown) cooperating with at least one hemispherical notch 48 in the surface 22 of the rotatable member to define positions determined by it. These positions are selected such that each of them results in selected alignment of outlet duct 27 with one of the ducts 17 to supply water to one of the hydraulic units connected to the valve. At least one shut-off position can also be defined in this fashion.

Washer 57, made of anti-friction material, can be inserted between part 23 of the rotatable member and cap 30 to decrease rotatable frictional forces. One can also use various materials to make the valve function practically. Generally, body 11, cap 30 and control stem 32 are metallic. Parts 21 and 23 of the rotatable member 20 are plastic material. In any case, one may avoid the use of expensive materials such as ceramics or other hard metals with the valve according to the invention.

The device according to FIG. 4 works in the same way as explained with reference to FIGS. 1–3 with the addition of the functions intended to limit mobility due to peg 14 and the definition of the operating positions due to detent member 46.

Figure 5:
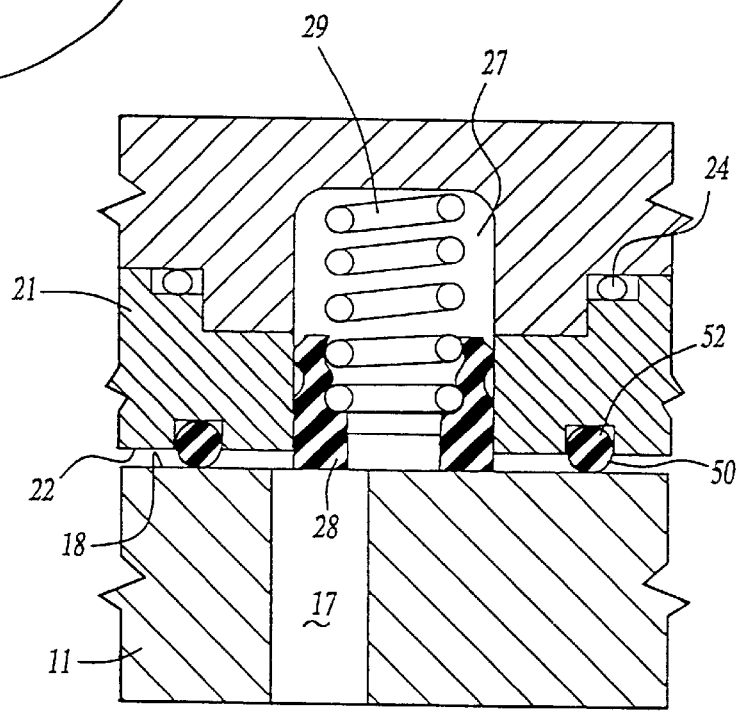
FIG. 5 is an enlarged fragmentary view of an alternate embodiment of disc member 21.
Figure 6:
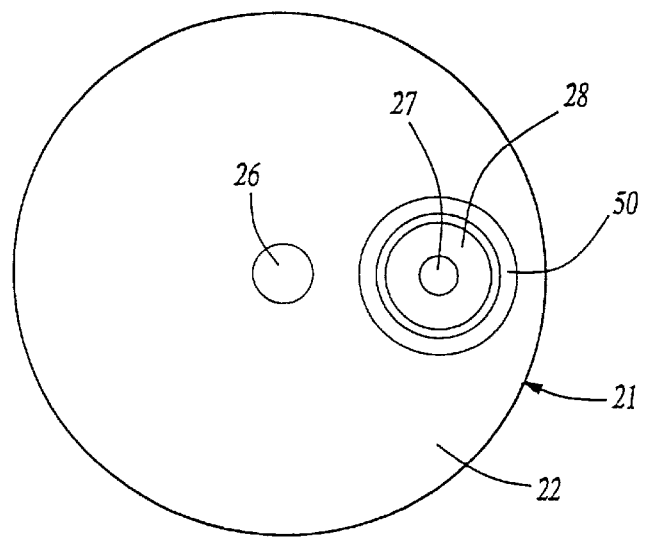
FIG. 6 is a plan view of the disc member 21 shown in FIG. 5.

There may be situations where it is desired to have fuller sealing of the separate outlets 17 from duct outlet 27 even during operation of rotatable member 20. In such a situation it is desired to add a sealing ring 50 about sealing element 28 to prevent any cross-flow as sealing element 28 crosses over any outlet 17 as shown in Figures. Such a sealing ring 50 is merely seated in a complementary groove 52 in surface 22 as shown in FIGS. 5 and 6.

It is understood that the invention is not confined to the embodiments described and illustrated as examples. Such modifications are well within the grasp of the expert in the field. For example, the inlet connections can vary in number and be arranged in various ways. The number of outlet connections depends on the intended use and can also vary. The sealing devices, each described as consisting of a collar made up of elastomeric material provided with a spring, could have a different structure. In particular, they could be made up of collars that are pushed by their own elasticity or by rigid collars pushed by springs and provided with retaining packing. Stem member 20 could have a shape different from a shaft, for example, it could be a lever or a key.

These and other modifications and any substitution with technical equivalents can be introduced without departing from the scope of the invention and the coverage of this patent as defined by the appended claims.

I claim:

1. A valve device being operably interposable between a flow control device and at least one fluid delivery unit that can be supplied under the control of said device, said valve device characterized by:

a fixed body with an inner facing surface that has an inlet connection and at least one outlet connection radially spaced from said inlet connection;

a rotatable valve member having a respective facing surface that is rotatable about a common axis with the inlet connection to selectively open and close fluid connection between said inlet connection of the fixed body and one of the at least one outlet connection of said rotatable member;

one of the fixed body and rotatable valve member houses a first sealing member sealingly biased against said facing surface of the other of said fixed body and rotatable valve member, said rotatable member having an internal conveyance duct that has an inlet opening on its surface co-aligned with the inlet connection in said fixed body and said axis of rotation and having an outlet radially spaced the same distance from said inlet of said rotatable member as said at least one outlet in said fixed member is spaced from said respective inlet connection;

one of and said at least one outlet in said fixed body and said outlet in said rotatable member contains a respective second sealing member biased against a surface of the other of said rotatable member and fixed body;

further characterized by the respective second sealing member in one of the rotatable valve members or fixed body when completely misaligned from any of the outlets in the other of the rotatable members or fixed body and sealingly closes said duct from said outlet in said fixed body to form a stop valve;

an outer O-ring sealing ring about said second spring biased sealing member to prevent cross flow as the second spring biased sealing member crosses over an outlet during rotatable operation of said rotatable valve member;

said fixed body having a least two outlets at its inner facing surface both being equally spaced from said inlet in said fixed body;

said respective sealing member positioned at the outlet end of said duct and biased to abut the inner facing surface of said fixed body;

said first sealing member seated in said fixed body and sealingly biased against said surface of said rotatable member about said inlet opening; and said sealing members are made from elastomeric material and are biased by a respective spring.

2. A valve device as defined in claim 1, further characterized by said sealing members made from elastomeric material that are biased by their own resilient elasticity.

3. A valve device as defined in claim 1, further characterized by said rotatable valve member assembled to a second rotatable member, and said conveyance duct is determined by the configuration in the nature of a cavity presented by the respective facing surfaces of the juxtaposed rotatable valve member and second rotatable member.

4. A valve device as defined in claim 3 further characterized by:

one of the rotatable valve member or second of the rotatable member is linked to a driving device and a torque transmitter is provided between the second rotatable member and rotatable valve member.

5. A valve device as defined in claim 1, further characterized by a resiliently biased detent release member, cooperating with notches, as arranged between the fixed body and the rotatable valve member to provide an indication of the correct operating position of the valve, where one respective sealing member is exactly aligned about the other of the outlets in said rotatable member and one outlet in said fixed body.

6. A valve device as defined in claim 1, further characterized by a stop limiter interconnected between the fixed body and rotatable valve member for limiting the rotational movement that the rotatable member may have with respect to the fixed body.

7. A valve device as defined in claim 1 further characterized by:

said rotatable valve member being a circular disc with its axis of rotation being a central axis of said circular disc.

\* \* \* \* \*